United States Patent [19]

Schoeneberger

[11] 4,390,094

[45] Jun. 28, 1983

[54] AUTOMATIC LATCH FOR UNLOADING AUGER

[75] Inventor: Ernest A. Schoeneberger, New Holland, Pa.

[73] Assignee: Sperry Corporation, New Holland, Pa.

[21] Appl. No.: 235,394

[22] Filed: Feb. 18, 1981

[51] Int. Cl.³ ............................................. B65G 21/10
[52] U.S. Cl. .................................... 198/865; 198/320; 198/548; 414/504; 414/526; 366/186
[58] Field of Search .............. 198/313, 320, 632, 666, 198/668, 865, 545, 548, 555, 558, 536; 414/319, 32 Q, 504, 505, 526, 326, 332; 366/50, 186, 603; 241/101 B

[56] References Cited

U.S. PATENT DOCUMENTS

| | | | |
|---|---|---|---|
| 2,741,512 | 4/1956 | Stott et al. | 198/320 |
| 3,347,350 | 10/1967 | Lindstrom et al. | 198/865 |
| 3,521,768 | 7/1970 | Rohwedder | 198/865 |
| 4,000,805 | 1/1977 | Hadler | 198/320 |

Primary Examiner—Joseph E. Valenza
Attorney, Agent, or Firm—Darrell F. Marquette; Frank A. Seemar; Larry W. Miller

[57] ABSTRACT

A movable unloading auger is automatically latched and unlatched with respect to a support member by connecting a lifting winch and cable to a movable latch arm attached to the auger, thus advantageously permitting hands-off latching and unlatching operations. A latch arm receiver protrudes from the support member for engagement with a notch formed in the latch arm.

5 Claims, 3 Drawing Figures

U.S. Patent  Jun. 28, 1983  4,390,094
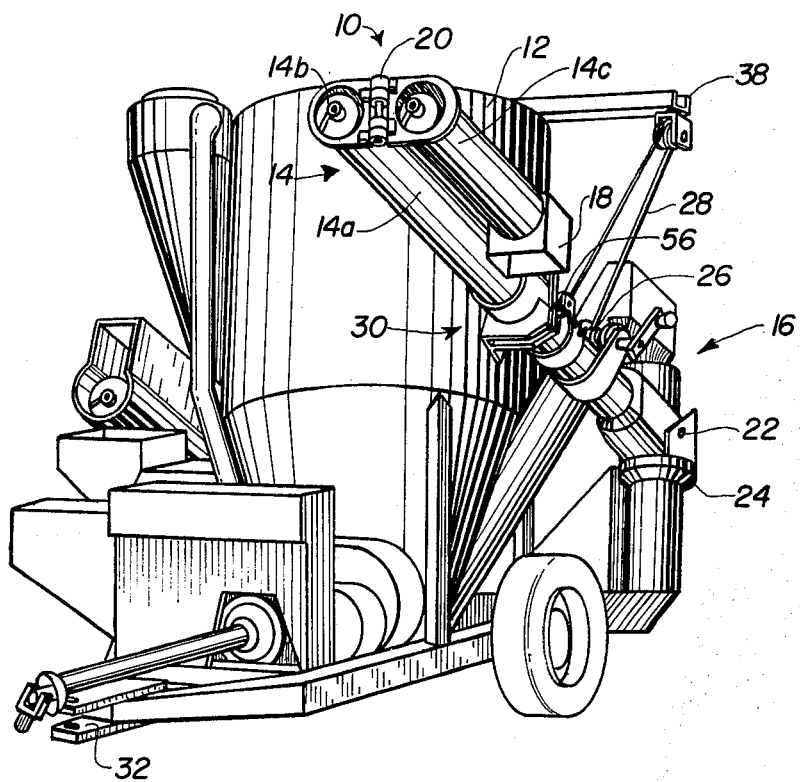
Fig. 1
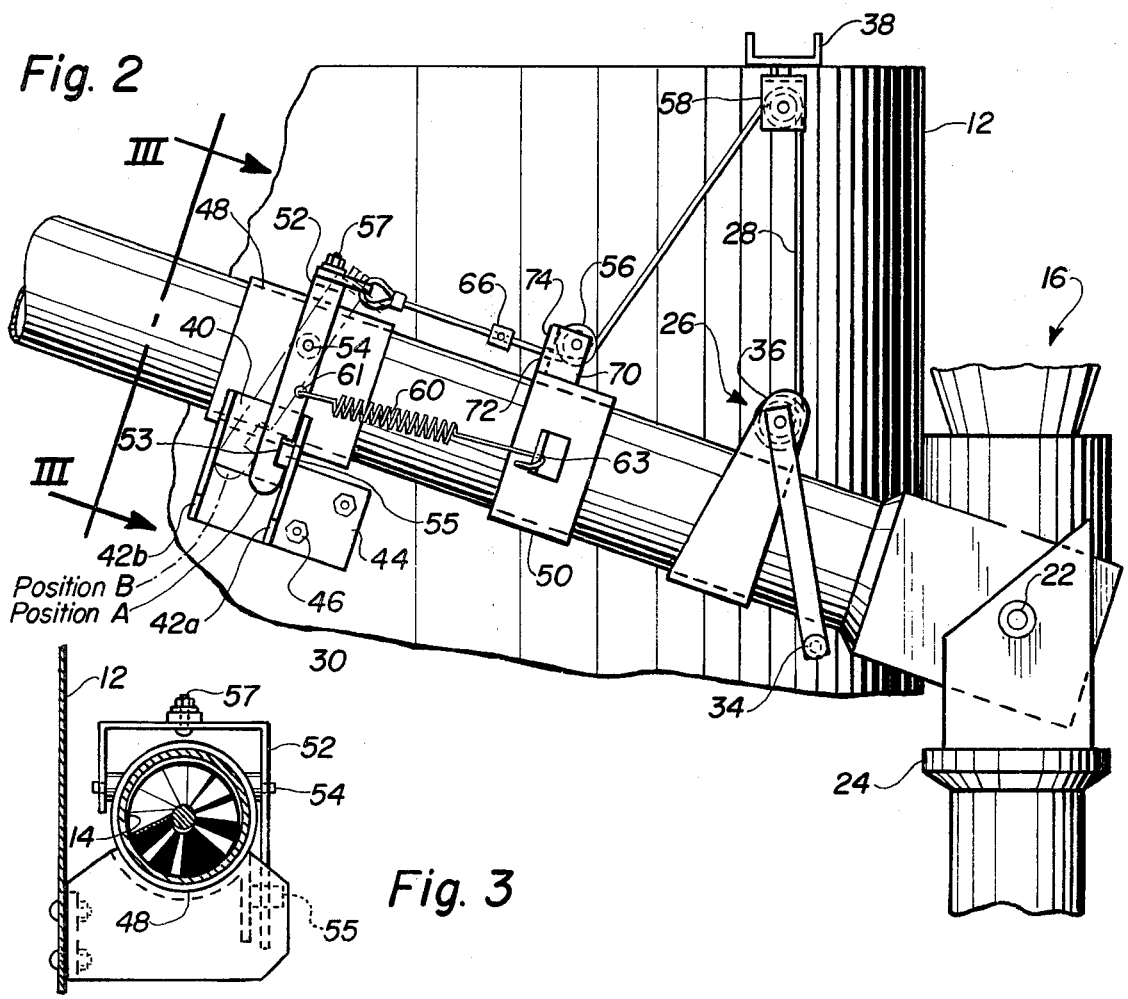
Fig. 2
Fig. 3

AUTOMATIC LATCH FOR UNLOADING AUGER

BACKGROUND OF THE INVENTION

This invention relates generally to solid material comminution apparatus of the mill or mixer type and more particularly to an automatic latch for the unloading auger of an agricultural grinder-mixer.

Grinder-mixers are well known agricultural devices for grinding and mixing various grains and grasses into a suitable feed mix for feeding livestock. Once the feed is ground and mixed it is conveyed, via an unloading auger, to a feeding or a storage location.

The unloading auger is attached to the grinder-mixer for movement which permits up and down pivoting as well as side-by-side swinging. When the auger is not in use, and particularly when the grinder-mixer is being transported, it is important to secure the auger to limit movement thereof which could result in substantial hazard and damage.

Typically, an auger support provides a rest position for the auger and a latch secures the aguer on the support. When the auger is to be used, the latch is manually released so that the auger can be raised or lowered and swung in an arcuate path relative to the grinder-mixer. A winch, in combination with a cable and one or more pulleys, is used to raise or lower the auger. When the aguer is not in use, the auger is returned to the auger support and latch is manually engaged to secure the auger on the support.

Manual release and engagement of the latch is undesirable for several reasons. It is time consuming, the latch is usually positioned for limited access so that the operator must climb and reach, and the operator is often required to release and engage the latch while simultaneously operating the winch. The latter is difficult because the winch and latch are usually at remote locations on the auger.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing an automatic latch for a movable auger used for unloading material generally from a container and more particularly for unloading crop material from agricultural machinery such as a grinder-mixer. A support member is provided for supporting the auger. A movable latch arm includes a notch formed therein and is mounted on the auger and the notch engages a latch arm receiver extending from the support member. A winch and cable are operably connected to move the latch arm between a first position, in engagement with the receiver, and a second position, out of engagement with the receiver. A resilient member urges the latch arm to the first position. Means are provided for limiting movement of the latch arm in the second position.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is an isometric view illustrating an exemplary grinder-mixer utilizing an embodiment of the latching apparatus of this invention;

FIG. 2 is a diagrammatic view illustrating an embodiment of this invention; and

FIG. 3 is a view illustrating an embodiment of this invention viewed from line III—III.

DESCRIPTION OF THE PREFERRED EMBODIMENT

Referring to the drawings, FIG. 1 illustrates a commercially available agricultural grinder-mixer generally designated 10 and including a large container portion 12 wherein crop material is mixed. The resulting mix can be unloaded via a discharge device commonly called an unloading auger 14. As it is well known, auger 14 is an elongated tubular device 14a having an auger-like member 14b rotatably mounted therein for moving material from an infeed end 16 and outwardly through a spout 18. Often, as shown in FIG. 1, such unloading augers 14 include an extension 14c pivotally connected at 20 thus permitting a reduction in the overall length of the unloading aguer.

It is well-known that infeed end 16 is pivotally and rotatably connected at 22,24, respectively, to grinder-mixer 10. This permits spout 18 to be directed to a desired position for discharge of the crop material. Also, well-known is the fact that a winch 26 and cable 28 combination are operably connected for raising and lowering unloading aguer 14 relative to a support member 30 connected to grinder-mixer 10 for supporting auger 14 in a "stored" position when not in use, such as when grinder-mixer 10 is to be transported, usually by a tow connected at tow bar 32. As illustrated in FIGS. 1 and 2, winch 25 is attached to auger 14 and includes a rotatable handle 34 for winding cable 28 on a drum 36. Cable 28 is connected to both the auger 14 and the grinder-mixer 10 (at a support 38) and through varying a number of pulleys and cable strands, mechanical advantage can be controlled.

Support member 30, FIGS. 1 and 2, generally includes a fabricated steel cradle portion 40 having a generally arcuate shape of a construction sufficient for receiving auger 14. A pair of spaced apart steel braces or plates 42a,42b are connected by welding or the like to cradle 40, and extend to include a flange 44 which is attached to container 12 by bolts 46 or the like.

An annular steel reinforcing collar 48, FIG. 2, is attached by welding to auger 14. Collar 48 is positioned on auger 14 for seating alignment with cradle 40. Another annular steel reinforcing collar 50 is similarly attached to auger 14 and spaced from collar 48. A generally U-shaped steel latch arm member 52, see FIGS. 2 and 3, is pivotally connected to collar 48 at pivot points 54 for pivoting from a first (solid line) position A to a second (dotted line) position B. Arm 52 includes a steel latch arm receiver such as a member 55 connected to protrude from plate 42a. Member 55 is of a construction sufficient to be engaged by notch 53.

Referring also to FIGS. 1 and 2, a pulley 56 is appropriately connected to collar 50. Cable 28 extends from drum 36, via another pulley 58 connected to support 38, around pulley 56 and terminates at an appropriate connection, such as a bolt and nut 57, mounted on latch arm 52. As previously stated, the numbers of pulleys and cable strands can be varied to control the mechanical advantage desired.

Winch 26 and cable 28 provide a means for raising and lowering auger 14 relative to support 30. Thus, a tensioning force applied to cable 28 will tend to pivot latch arm 52 from first position A, where notch 53 is in engagement with member 55, to second position B, where notch 53 is not of engagement with member 55. When such tensile force is removed and cable 28 becomes relaxed, such as when auger 14 is seated in cradle 40, a resilient means such as a steel tension spring 60, urges latch arm 52 from position B back to position A. Spring 60 has one end 61 connected to latch arm 52 and has another arm 63 connected to collar 50.

Means, such as a steel stop member 66 is connected for movement with cable 28 between latch arm 52 and pulley 56, for limiting movement of latch arm 52 to position B. This is accomplished by connecting pulley 56 to an appropriate steel member 70 welded on collar 50 and having a flange member 72. A slot 74 in member 72 is of a construction sufficient for permitting movement of cable 28 therethrough but will not permit stop member 66 to pass therethrough. Thus, any sufficient movement of cable 28 which moves latch arm 52 from position A to B will move stop 66 toward slot 74. However, stop 66 will not pass through slot 74 and thus movement of latch arm 52 from position A will be limited to position B.

With the parts assembled as set forth above, it can be seen that movement of handle 34, such as to apply a tensile force to cable 28, will raise auger 14 out of cradle 40. Due to the connection of cable 28 to latch arm 52, the latch arm is pivoted and notch 53 is disengaged from protruding member 55. Movement of latch arm 52 is limited to position B due to stop member 66 engaging member 72, or alternatively, movement of latch arm 52 is limited to position B due to arm 52 engaging plate 42b. Thus, auger 14 is automatically unlatched.

When auger 14 is lowered to rest in cradle 40, cable 28 becomes relaxed and spring 60 urges latch arm 52 to return to position A. Thus, auger 14 is automatically latched.

The foregoing has described an automatic latching apparatus for use with an auger used for unloading material from a container.

It is anticipated that aspects of the present invention, other than those specifically defined in the appended claims, can be obtained from the foregoing description and the drawings.

Having thus described the invention what is claimed is:

1. In combination with a container having a movable unloading auger, the improvement comprising:
    means for supporting said auger, said means being a support member connected to said container and extending therefrom;
    a latch arm movably mounted on said auger, said latch arm having a notch formed therein;
    a latch arm receiver connected to said container, said receiver being a protruding member connected to said support member for engagement with said latch arm notch;
    means connected for raising and lowering said auger, said means including a cable operably connected to move said latch arm between a first position, where said notch is in engagement with said receiver protruding member, and a second position, where said notch is out of engagement with said receiver protruding member;
    resilient means for urging said latch arm from said second position to said first position;
    means for limiting movement of said latch arm to said second position;
    said latch arm being moved from said first position to said second position when the tension in said cable overcomes the force of said resilient means; and
    said latch arm being moved from said second position to said first position when the force of said resilient means overcomes the tension in said cable.

2. The apparatus of claim 1 wherein said means for limiting is a plate connected to said support member.

3. The apparatus of claim 1 wherein said resilient means is connected between said latch arm and said auger.

4. The apparatus of claim 1 including:
    means for guiding said cable including at least one pulley, said means for limiting including a stop connected to move with said cable.

5. An agricultural grinder-mixer comprising:
    an unloading auger movably connected to the mixer;
    means for supporting the auger, said means being a support member connected to and extending from the mixer;
    a latch arm movably connected to the auger, said arm having a notice formed therein;
    means connected for raising and lowering said auger relative to said support, said means including a winch and cable operably connected to move said latch arm;
    a latch arm receiver connected to protrude from said support and into said notch;
    resilient means connected for urging said latch arm into a first position where said notch is engaged with said receiver;
    means connected for moving said latch arm to a second position where said notch is disengaged from said receiver in response to movement of said winch and cable, said means including a pulley connected to said auger adjacent said latch arm;
    means for limiting movement of said latch arm to said second position;
    said latch arm being moved from said first position to said second position when the tension in said cable overcomes the force of said resilient means; and
    said latch arm being moved from said second position to said first position when the force of said resilient means overcomes the tension in said cable.

* * * * *